US010621789B1

(12) United States Patent
Davis et al.

(10) Patent No.: US 10,621,789 B1
(45) Date of Patent: Apr. 14, 2020

(54) TRACKING LOCATION AND RESOLVING DRIFT IN AUGMENTED REALITY HEAD MOUNTED DISPLAYS WITH DOWNWARD PROJECTION (71) Applicant: Disney Enterprises, Inc., Burbank, CA (US)

(72) Inventors: Randall S. Davis, Stevenson Ranch, CA (US); Elliott H. Baumbach, Porter Ranch, CA (US); Nathan D. Nocon, Valencia, CA (US); Todd Michael Graham, Lewis Center, OH (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/169,032

(22) Filed: Oct. 24, 2018

(51) Int. Cl.
*G06T 19/00* (2011.01)
*G06T 7/70* (2017.01)
*G02B 27/01* (2006.01)
*G06T 7/20* (2017.01)
*G06F 3/01* (2006.01)

(52) U.S. Cl.
CPC ........ *G06T 19/006* (2013.01); *G02B 27/0172* (2013.01); *G02B 27/0176* (2013.01); *G06F 3/012* (2013.01); *G06T 7/20* (2013.01); *G06T 7/70* (2017.01); *G02B 2027/0138* (2013.01); *G02B 2027/0161* (2013.01)

(58) Field of Classification Search
CPC ......... G06T 19/006; G06T 19/20; G06T 7/20; G06T 7/70; G06F 3/012; G02B 27/0172; G02B 27/0176; G02B 2027/0138
See application file for complete search history.

(56) References Cited

U.S. PATENT DOCUMENTS

| 9,311,883 | B2* | 4/2016 | Cajigas | G09G 5/00 |
| 9,995,936 | B1* | 6/2018 | Macannuco | G02B 27/0172 |
| 9,996,984 | B2* | 6/2018 | Haseltine | G06T 19/20 |
| 2014/0152531 | A1* | 6/2014 | Murray | G06F 1/1632 345/8 |
| 2016/0154244 | A1* | 6/2016 | Border | G02B 27/0176 359/630 |
| 2017/0139212 | A1* | 5/2017 | Choi | G06F 1/163 |
| 2017/0219826 | A1* | 8/2017 | Haseltine | G02B 27/0172 |
| 2018/0114353 | A1* | 4/2018 | Champion | G06T 15/005 |
| 2018/0247464 | A1* | 8/2018 | Haseltine | G06T 19/20 |

* cited by examiner

*Primary Examiner* — Ryan R Yang
(74) *Attorney, Agent, or Firm* — Patterson + Sheridan, LLP (57) ABSTRACT

Embodiments provide for tracking location and resolving drift in Augmented Reality (AR) devices. The AR devices includes computing devices having screens on a first face and cameras on a second, opposite face to project an image onto optical arrangements for viewing by wearers of the AR devices. The AR devices map locations for real objects in the environment to a virtual environment; anchor virtual objects at anchor locations within the virtual environment; capture station keeping images of the environment from a first Field of View via the camera; determine a second, different Field of View in the environment for the wearer of the AR device based on the relative locations of real objects present in the station keeping images; and output images depicting the virtual objects at positions on the screen to depict the virtual objects in the physical environment at the anchor locations.

20 Claims, 8 Drawing Sheets

TRACKING LOCATION AND RESOLVING DRIFT IN AUGMENTED REALITY HEAD MOUNTED DISPLAYS WITH DOWNWARD PROJECTION

BACKGROUND

Augmented Reality (AR) includes the provision of virtual objects over a view of the real-world environment to provide operational information, gameplay experiences, and information overlays to users. Various devices may be used to provide AR experiences to users. Some of these AR devices project virtual objects onto a reflecting medium to overlay virtual objects onto a real-world environment visible to a user. Other examples of AR devices provide a video feed into which the virtual objects are inserted for display to the user. In each case, the AR device may determine an orientation of the Field of View (FOV) for the user in the environment and identify various real objects, so that virtual objects may be displayed in consistent and appropriate locations for the intended AR experience.

SUMMARY

In one embodiment of the present disclosure, an Augmented Reality (AR) device is provided, the AR device comprising: a viewport; a mount assembly configured to capture a mobile computing device, the mount assembly including: a lower surface that is transmissive to light; an upper surface, located above the lower surface and configured to capture the mobile computing device between the upper surface and the lower surface, the upper surface including a region transmissive to light; an optical arrangement configured to receive light transmitted through the lower surface and reflect light onto the viewport for reflection to a wearer of the AR device; and an additional optic, arranged above the region of the upper surface and configured to direct light from the environment outside of a field of view of the wearer.

In one embodiment of the present disclosure, an Augmented Reality (AR) system is provided, the AR system comprising: a viewport; a computing device, including a screen on a first face and a camera on a second face opposite to the first face; an optical arrangement configured to receive light generated by the screen and reflect the light onto the viewport for reflection to a wearer of the AR system; and an additional optic, arranged above the camera to direct light from the environment outside of a field of view of the wearer to the camera.

In one embodiment of the present disclosure, a method for tracking location and resolving drift in an Augmented Reality (AR) device is provided, in which the AR device includes a computing device having a screen on a first face and a camera on a second face opposite to the first face mounted in a mounting assembly to project an image from the screen onto an optical arrangement for viewing by a wearer of the AR device, the method comprising: mapping locations for real objects in a physical environment in which the AR device resides to a virtual environment; anchoring a virtual object at an anchor location within the virtual environment, based on the mapped locations of the real objects; capturing a station keeping image of the environment from a first Field of View via the camera; determining a second Field of View in the environment for the wearer of the AR device that is different from the first Field of View based on the relative locations of real objects present in the station keeping image; and in response to determining that the second Field of View includes an area of the physical environment corresponding to the anchor location in the virtual environment, outputting an image depicting the virtual object at a position on the screen to display the image depicting the virtual object in the physical environment at the anchor location.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated. Various portions of the appended drawings may be exaggerated or simplified for explanatory purposes.

DETAILED DESCRIPTION

The present disclosure provides improvements for Augmented Reality (AR) devices in tracking locations and resolving drift, especially in Head Mounted Displayed (HMD) that use a downward facing display for projecting virtual objects onto a view of the real-world environment. As the sensors used for determining a location/orientation in the environment may become saturated or drift, an AR device may begin to position virtual objects for display incorrectly relative to the environment visible to the user. The present disclosure overcomes these and other challenges by providing a camera, or other visual sensor, with an opposing orientation to the display that projects virtual objects with a view of the environment. For example, a smart phone used as an AR device in an HMD may have a screen project the virtual objects and a rear-mounted camera (i.e., a camera mounted on the face opposite to the screen) be exposed from the HMD. The camera provides the AR device with a reference perspective on the environment includes several static objects (e.g., wall decorations, light fixtures, windows, ceiling tiles) and is generally free of mobile objects that are present in other perspectives (e.g., persons, pets, cars). The AR device uses this reference perspective to determine or correct the determined location/orientation of the user to thereby avoid or reduce sensor drift affecting where virtual objects in the AR experience are placed relative to the user and real objects in the environment. The form factor of the HMD is improved to allow the selective attachment of a multi-purpose AR device (e.g., a smart phone or tablet) to include free access for a back camera to the environment and the selective attachment of one or more additional optics (e.g., lenses, mirrors, filters) for use in conjunction with the back camera.

Figure 1:
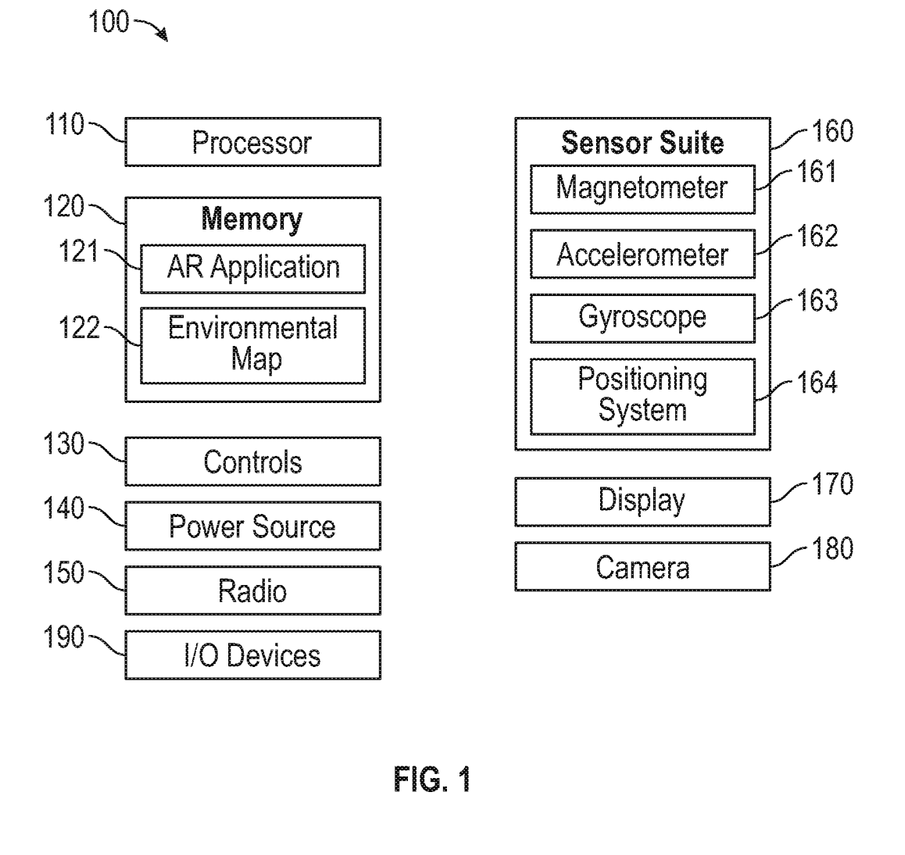
FIG. 1 illustrates a system for providing an Augmented Reality experience, according to one embodiment of the present disclosure.

FIG. 1 illustrates a system 100 for providing an AR experience, according to one embodiment. Within a system 100, a computing device 105 communicates with one or more first sensor devices 150, second sensor devices 160, display devices 170, and audio output devices 180. The computing device 105 provides an AR display functionality for a user in the interactive environment. The computing device 105 may be embodied in any suitable form. In some embodiments, the computing device 105 is a body-worn computing device, e.g., integrated into an assembly worn on the head, arm, chest, back, etc., of a user. In some embodiments, the computing device 105 comprises a mobile computing device, such as a smartphone, tablet, etc. The mobile computing device may be selectively removed and attached with a body-worn assembly.

Computing device 105 include at least a processor 110 and a memory 115. The processor 110 generally retrieves and executes programming instructions stored in the memory 115. Processor 110 is included to be representative of a single central processing unit (CPU), multiple CPUs, a single CPU having multiple processing cores, graphics processing units (GPUs) having multiple execution paths, and the like. The memory 115 is generally included to be representative of a Random Access Memory (RAM), but may further include non-volatile storage of any suitable type(s).

Memory 115 includes program code for performing various functions related to generating and maintaining the AR experience. The program code is generally described as various functional "modules" within memory 115, although alternate implementations may have different functions or combinations of functions. Within memory 115, an AR application 120 is generally configured to generate virtual objects based on a selected predetermined AR experience template (e.g., a game/story stored in memory 115), and based on identified real objects in the environment.

The radio 150 provides wireless communications for the computing device 105. In various embodiments, the radio 150 is a transmitter/receiver, which receives signals from external sources and transmits signals to external devices. The radio 150 may be in communication with various antennas and may configure messages to be transmitted or received according to various standards, such as, Bluetooth, Wi-Fi, or a proprietary standard. The AR application 120 may identify and communicate with external devices in the environment as part of the AR experience or as references points based on a visual appearance or transmitted identifier (e.g., a beacon such as an infrared (IR) signal, or a radio frequency (RF) signal). External devices may include navigational beacons, external controllers, other computing device 105, etc.

The sensor suite 160 includes a magnetometer 161, an accelerometer 162, a gyroscope 163, a positioning system 164, and visual sensors 165 among other sensors. The sensor suite 160 may include additional sensors, several instances of each sensor, or may omit some of the example sensors discussed herein. In some embodiments, the AR application 120 uses the sensor suite 160 to build an map of the environment, to determine where the computing device 105 is located, how the computing device 105 is oriented, and to identify when to display virtual objects to the user on a display 170 based on the location and orientation and any real objects identified in the FOV.

The magnetometer 161 is a sensor that provides a bearing to a north pole of a magnetic field in the environment in which the computing device 105 is present. The magnetometer 161 may thus provide the computing device 105 with a directional sense in terms of yaw orientation with respect to magnetic north.

The accelerometer 162, which measures acceleration forces acting on the computing device 105, may provide the computing device 105 with information of whether the computing device 105 (or a portion thereof) is moving, and in which direction(s).

The gyroscope 163 measures orientation of the computing device 105 (or a portion thereof), and may provide the computing device 105 with information of whether the computing device 105 (or portion thereof) is level or to what degree the computing device 105 is tilted in one or more planes. The combination of the accelerometer 162 and gyroscope 163 may thus provide the computing device 105 with a directional sense in terms of pitch and roll with respect to gravity.

The positioning system 164 may provide absolute positioning information (e.g., via a Global Positioning System (GPS) receiver) and relative positioning information (e.g., via a range finder, a camera sensor including image recognition software to identify objects and distances thereto based on known sizes).

The visual sensors 165 include cameras configured to sense visible light or infrared light. For example, where the computing device 105 is a smartphone or tablet device, the visual sensors 165 may include a first camera on a first face of the computing device 105 and a second camera on an opposing second face of the computing device 105. These opposing cameras may be referred to as a "front camera" when located on the face of the computing device 105 that includes the display 170, and as a "back camera" when located on the face of the computing device 105 opposite to the display 170.

The memory 115 further includes an image processing module 125 configured to perform processing of visual information captured by visual sensors 165. The image processing module 125 may include any number of image processing functions, such as an object detection and tracking sub-module 130 configured to detect real objects within the environment (e.g., based on edge detection information, color information, or other suitable features) and to track the relative location of detected real objects over time (e.g., as a user or the real objects move throughout the environment). The image processing module 125 further includes a depth estimation sub-module 135 configured to dynamically estimate a distance of the detected objects from the computing device 105.

The system 100 includes one or more displays 170, and one or more audio output devices 180. The displays 170 may include visual displays of any suitable type, and are discussed in greater detail in regard to FIGS. 4A-C. The displays 170 may include any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. In some embodiments, the display 170 is included within the computing device 105 as a main display screen of the smartphone, tablet device, etc. In other embodiments, computing device 105 may transmit images for projection to a display 170 remote from the other hardware of the computing device 105. For example, a desktop or laptop computer may handle processing of the environment and sensor data to produce the AR experience, and transmit virtual objects display information to the display 170 in an HMD device for projection to the user. In some embodiments, two displays 170 (or a single split display 170) provide a 3D effect by projecting slightly different images to each eye of the user.

In various embodiments, the display 170 is the main screen of a mobile computing device. Generally, display 170 is used with an optical arrangement that is configured to transmit some or all of the screen output of a mobile computing device to the user's eyes. The optical arrangement is further configured to transmit some or all of the light from the physical environment to the user's eyes. Using a mobile computing device in conjunction with an optical arrangement can provide the user a reasonably good field of view, which enhances the immersive nature of the interactive environment. Generally, the size of the user's FOV is proportional to size of the elements included in the optical arrangement for a particular distance from the user's eyes.

Virtual objects that the AR application 120 may select for projection include characters, objects, and/or dynamic visual effects that are overlaid onto the user's natural FOV of the environment using a display device 170. For example, the display device 170 could superimpose a virtual character to appear seated on a physical chair detected within the environment. The display of the virtual character on the display device 170 is dynamically adjusted based on the user's FOV (orientation), the determined depth of the chair from the user, and so forth.

The audio output devices 180 may include conventional audio speakers having any suitable form factor (e.g., stand-alone, integrated in a stereo, headphones, etc.), as well as devices using alternative methods of producing sound perceptible by a user, such as bone conduction transducers in a body-worn device.

Figure 2:
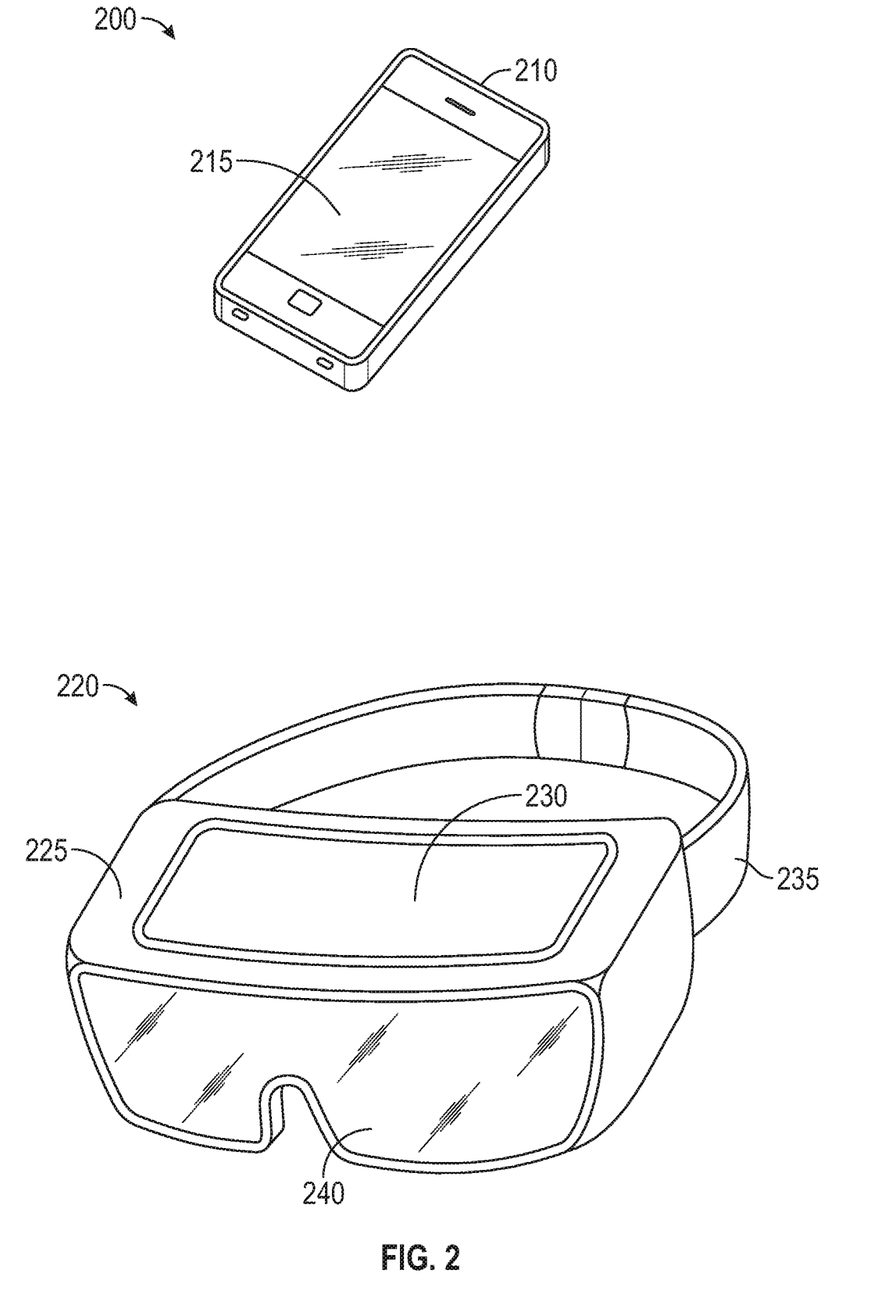
FIG. 2 illustrates a headset configured to interact with a mobile computing device, according to one embodiment of the present disclosure.

FIG. 2 illustrates a headset configured to interact with a mobile computing device, according to one embodiment. FIG. 2 depicts a mobile computing device 210 and an HMD device 220 that may be combined to provide an AR device wearable by a user. The HMD device 220 generally includes a mount assembly 225 (or "mobile device adapter"), a headstrap 235, and a viewport 240. The mount assembly 225 defines an opening 230 into which the mobile computing device 210 is received. Generally, insertion of the mobile computing device 210 into the opening 230 provides a selectively removable attachment point for the mobile computing device 210 with the mount assembly 225 and further arranges the screen 215 (representing an example of the display 170 of FIG. 1) with a predefined position. In the predefined position, the screen 215 has a suitable orientation relative to optical components (not shown) included in the HMD device 220. The mount assembly 225 may include any suitable means for selectively securing the mobile computing device 210 to the HMD device 220.

When the HMD device 220 is worn, the viewport 240 is positioned substantially in parallel with the face of the wearer (accounting for the curvatures of the wearer's face or the viewport 240) so that the wearer can see the environment through the viewport 240. The mount assembly 225 is arranged above the viewport 240 to hold or retain the mobile computing device 210 with a desired position and orientation above the eyes of the wearer of the HMD device 220. The mount assembly 225 holds the mobile computing device 210 such that a first face of the mobile computing device 210 that includes the screen 215 is pointed downward and substantially orthogonally to the viewport 240 (accounting for curvatures of the viewport 240) and a second face of the mobile computing device 210 opposite to the first face points upward.

The light generated by the screen 215 of the mobile computing device 210 is redirected through the optical components of the HMD device 220 so that the light can be seen by a wearer of the HMD device 220. For example, the generated light could pass through a beam-splitter and reflect off the viewport 240 and into the wearer's eyes. Thus, virtual objects that are displayed using the screen 215 appear as if present within the physical environment of the viewer. Advantageously, by leveraging the hardware resources of the mobile computing device 210, the HMD device 220 can be produced and sold at reduced costs, relative to other AR devices containing dedicated computer processors, display devices, and so forth.

Figure 3:
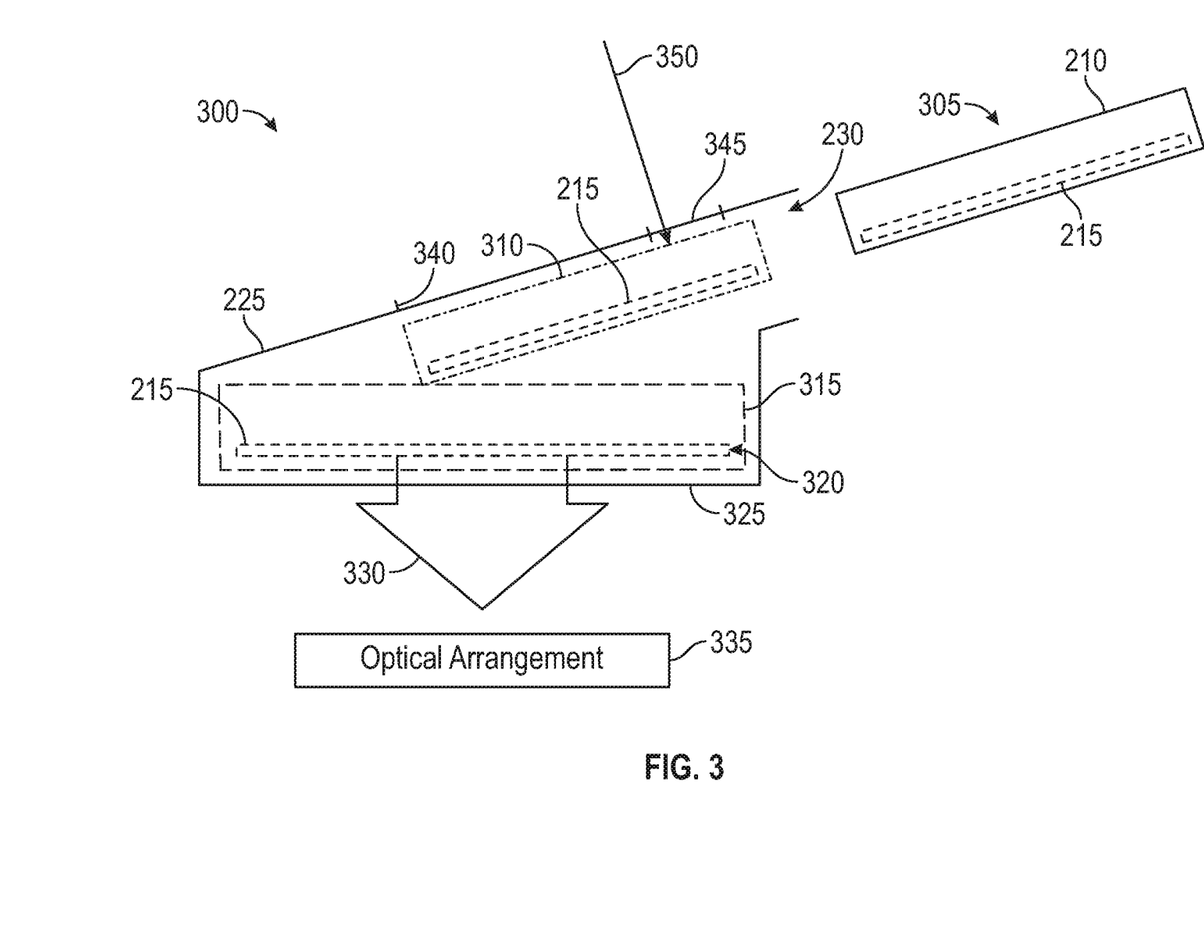
FIG. 3 illustrates attachment of a mobile computing device with a mount assembly, according to one embodiment of the present disclosure.

FIG. 3 illustrates attachment of a mobile computing device 210 with a mount assembly 225, according to one embodiment. More specifically, FIG. 3 depicts an exemplary sequence for inserting the mobile computing device 210 into the mount assembly 225. The mount assembly 225 may be formed of one or more elements of any material having suitable strength for retaining the mobile computing device 210. In some embodiments, the mount assembly 225 is formed of a plastic material, which advantageously provides a lighter HMD device than many metallic materials.

In FIG. 3, the mobile computing device 210 is inserted through an opening 230 formed in the mount assembly 225. The intermediate position 310 represents possible positioning of the mobile computing device 210 before reaching a predefined final position 315. At the predefined final position 315 of the mobile computing device 210, the display 215 of the mobile computing device 210 has a predefined position 320 relative to the optical arrangement 335.

A lower surface 325 of the mount assembly 225 is generally optically transmissive of light 330 generated by the screen 215. In some embodiments, the lower surface 325 is formed of an optically transmissive material, such as a plastic or glass, through which light 330 from the screen 215 is transmitted. In other embodiments, the lower surface 325 defines an opening through which light 330 from the screen 215 is transmitted. For example, the lower surface 325 may support the mobile computing device 210 around a periphery of the mobile computing device 210.

An upper surface 340 of the mount assembly 225 includes a region 345 that is optically transmissive of light 350 from the environment that is captured by a camera of a mobile computing device 210 mounted on a face opposite to the screen 215. In various embodiments, the region 240 is a hole defined in the material of the upper surface 340 or other area left free of the material of the upper surface 340. In other embodiments, the upper surface 340 is formed of an optically transmissive material, such as a plastic or glass, through which light 340 from the environment is gathered.

Although not explicitly shown, the mount assembly 225 may include further elements for selectively attaching or removing the mobile computing device 210 with the mount assembly 225. For example, a press fit may be formed between the mobile computing device 210 and mount assembly 225 using adjustable corner piece(s), a sliding tray with guide plug, toggle pin(s), a stepped slot, a replaceable tray, etc. For example, the mobile computing device 210 may be inserted into a replaceable tray or other suitable carrier member, which is then inserted to the mount assembly 225 to thereby arrange the display 215 with the predefined position 320. In this way, different carrier members may be used to accommodate different types of mobile computing devices 210 for a particular mount assembly 225.

Figure 4:
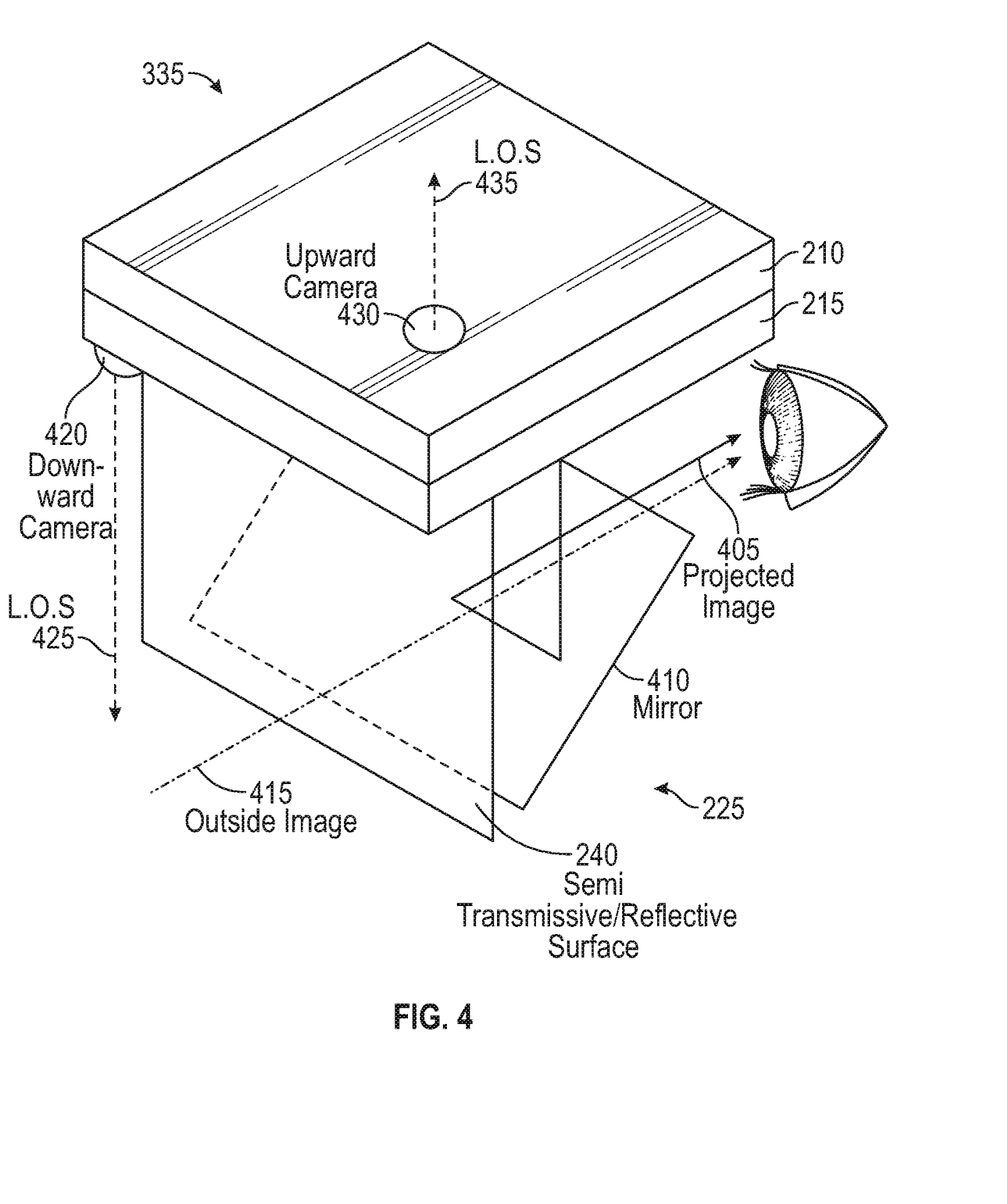
FIG. 4 illustrates an optical arrangement, according to one embodiment of the present disclosure.

FIG. 4 illustrates an optical arrangement 335, according to one embodiment of the present disclosure. The illustrated optical arrangement 335 is provided for explanatory purposes and is not limiting of the arrangements contemplated by the present disclosure. Although the present disclosure envisions the wearer having six degrees of freedom (i.e., movement and/or rotation on x, y, and z axes), references to orientation (downward, upward, above, below, etc.) are based an initial anatomically neutral position for the wearer. For example, a screen 215 pointed downward when the user is in the anatomical position and wearing the AR device may be considered pointed downward even when the user's head tilts as the screen 215 still points to the optical arrangement 335 as originally considered "downward." Additionally, portions of the mount assembly 225 that provide structural support or mask/block light from some of the display area of screen 215 or outside of the FOV offered through the viewport are omitted so as to not distract from the exemplary optical arrangement 335. For example, a mask may be provided to prevent the smartphone edges from being visible within the field of view, which tends to distract the viewer from the immersive nature of the AR experience.

The elements of the optical arrangement 335 collectively define a field of view relative to a predefined optical reference point, and the display device is generally designed such that the eye(s) of the viewer is aligned with the optical reference point. To support an AR capability of the display device, the mobile computing device 210 and mount assembly 225 are generally disposed outside of the field of view to allow a viewer to observe the physical environment through the optical arrangement 335.

Note that although the optical arrangement 335 is shown relative to a single eye of the viewer, implementations of the display 170, etc. can include independent optics for each eye of the viewer. Further, in some embodiments, implementations of the display device 400, 500, etc. may include some independent optics (e.g., one per eye) and some shared optics (e.g., one for both eyes). In one example, a single beam splitter element may be shared by two independent lens systems (e.g., two independent positive optical power mirrors) corresponding to the viewer's two eyes. Note additionally that alternative implementations of display 170, etc. may include one or more separate display devices (i.e., not included in the smartphone) and or one or more separate cameras (or other visual sensors 165). Further, the features described with respect to a particular implementation may be beneficially applied to other implementations without requiring an explicit recitation.

In the illustrated optical arrangement 335, the mobile computing device 210 is illustrated with the screen 215 oriented downward in a plane above the eye(s) of the viewer. An image 405 output by the display 215, such as a virtual object, is transmitted downward onto a reflector 410 in the mount assembly 225, which in turn reflects the image 405 onto an inner surface of the viewport 240 (or a secondary reflector) that reflects the image 405 to the eye of the viewer. In addition to the images 405 reflected to the viewer from the display, the viewport 240 is also at least partially transmissive to light from the environment so that an environmental image 415 is transmitted through the viewport to the eye of the viewer.

A front camera 420 of the mobile computing device 210 is oriented in the same direction as the screen 215, and in the illustrated embodiment is free of the mount assembly 225 to provide a downward view 425 into the environment. In various embodiments, the front camera 420 may be covered, and a downward view 425 may be omitted.

A back camera 430 of the mobile computing device 210 is oriented in the opposite direction as the screen 215, and in the illustrated embodiment is free of the mount assembly 225 to provide and upward view 435 into the environment. In various embodiments, various additional optics 440 are provided for use in conjunction with the back camera 430. As various mobile computing devices 210 position a back camera 430 at different positions on the rear face of the mobile computing device 210, the additional optics 440 are selectively attachable to various portions of the mobile computing devices 210 or mount assembly 225, to allow several different models of mobile computing devices 210 to be used in conjunction with the AR experience. Several examples of additional optics 440 are discussed in greater detail in regard to FIGS. 5A-C.

Figure 5A:
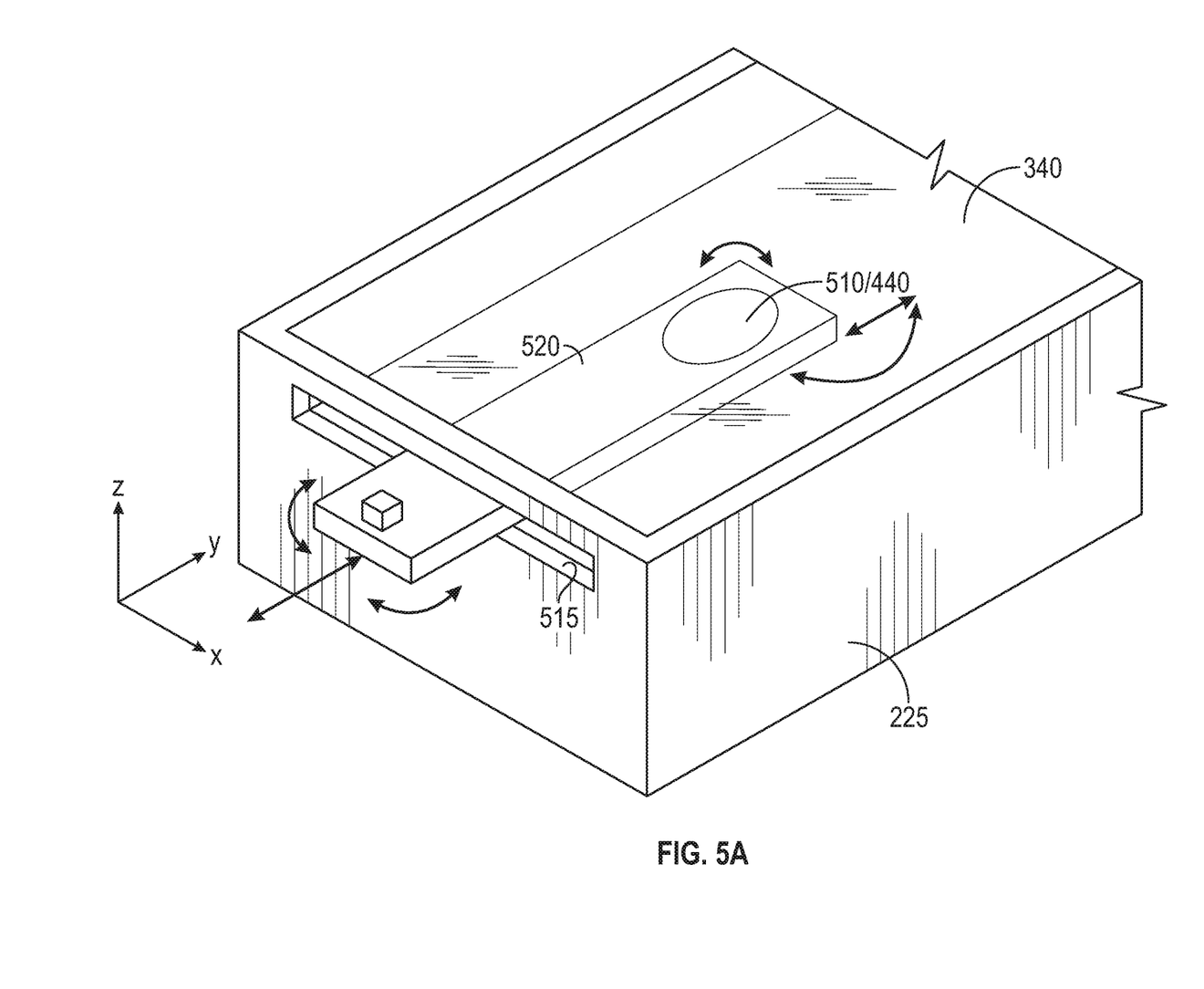
FIGS. 5A-C illustrate non-limiting examples of additional optics, according to embodiments of the present disclosure.
Figure 5B:
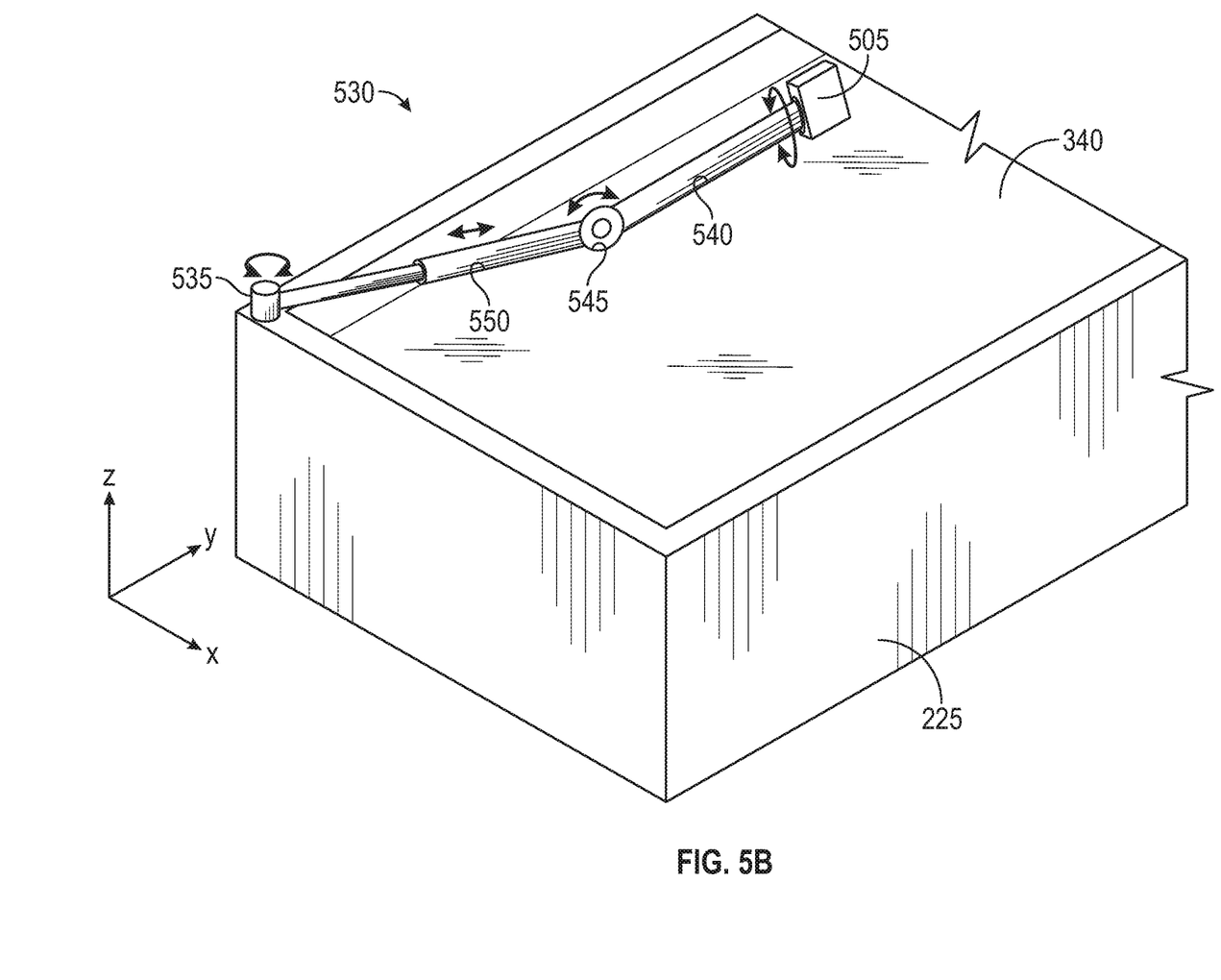
Figure 5C:
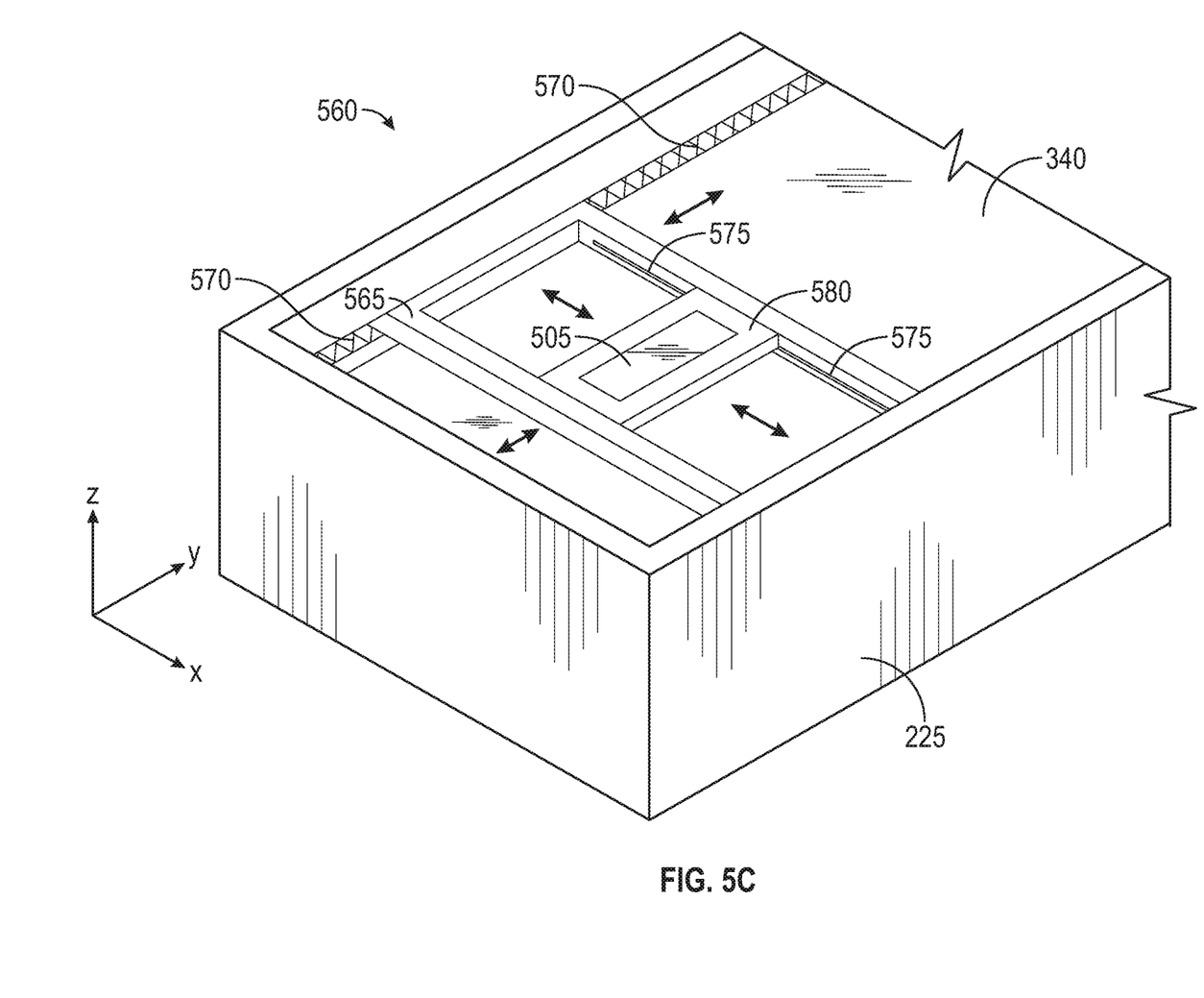

FIGS. 5A-C illustrate non-limiting examples of additional optics 440, according to embodiments of the present disclosure. Additional optics 440 are provided with adjustable members to position optical devices 505 at a variety of positions relative to mobile computing devices 210 of various constructions that are secured in the mount assembly 225 to accommodate back cameras 430 located at different positions on the various mobile computing devices 210. The optical devices 505 include mirrors, lenses (e.g., wide angle lenses), and filters (e.g., polarizing filters, color filters, waveguide shifters) that affect the light gathered by the back camera 430, and thus the image of the environment collected by the mobile computing device 210.

In FIG. 5A, an additional optic 440 of a slot-mounted optic 510 is illustrated. The mount assembly 225 defines a slot 515 through which a carrier beam 520 on which an optical device 505 (a lens in the illustrated example) is disposed. The slot 515 is sized such that the carrier beam 520 may be selectively adjusted in plane with the upper surface 340 of the mount assembly 225 (e.g., co-planar rotation and translation). A user may thus adjust where the optical device 505 is located relative to a back camera 430 to accommodate various models of mobile computing devices 210. Once the user has positioned the optical device 505 in a desired location, one or more clamps 525 are engaged to capture the carrier beam 520 between the clamp(s) 525 and the slot 515 via pressure and friction.

In FIG. 5B, an additional optic 440 of an arm-mounted optic 530 is illustrated. The arm-mounted optic 530 is connected to the mount assembly 225 via a pivot 535 that allows an arm 540 to rotate relative to the mount assembly 225 and a mobile device 210 captured thereby. One or more joints 545 are defined in the arm 540 to allow portions the arm 540 to bend and/or rotate relative to other portions of the arm 540. In some embodiments, the arm 540 includes telescopic segments 550 that enable the length of a portion of the arm 540 to increase or decrease. At the distal end of the arm from the pivot 535, the arm 540 includes an optical device 505 (a mirror in the illustrated example) that a user may position relative to a back camera 430 by bending, rotating, and/or telescoping the arm 540 to accommodate various models of mobile computing devices 210. Once the user has positioned the optical device 505 in a desired location, internal friction in the pivot 535, joints 545, and/or telescopic segments 550 may hold the optical device 505 in position relative to the back camera 430, or screws (not illustrated in the pivot 535, joints 545, and/or telescopic segments 550 may hold the arm 540 in position.

In FIG. 5C, an additional optic of a slide-mounted optic 560 is illustrated. A first carrier 565 of the slide-mounted optic 560 is connected to the mount assembly 225 via grooves 570 defined in the mount assembly 225, by which the slide-mounted optic 560 travels on one axis of the mount assembly 225. Secondary grooves 575 defined in the first carrier 565 capture a second carrier 580, which travels in a second, parallel axis of the mount assembly 225. The second carrier 580 includes an optical device 505 (a filter in the illustrated example) that a user may position relative to a back camera 430 by sliding one or more of the first carrier 565 and the second carrier 580 to accommodate various models of mobile computing devices 210. Once the user has positioned the optical device 505 in a desired location, internal friction in between the respective grooves 570/575 and carriers 565/580 may hold the optical device 505 in position relative to the back camera 430, or screws/clamps (not illustrated) may hold the slide-mounted optic 560 in position.

Figure 6:
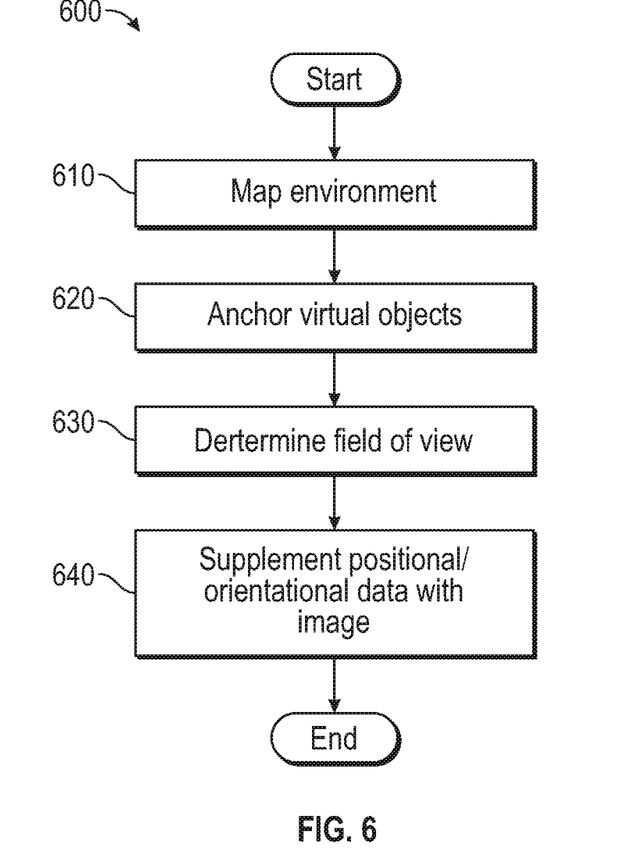
FIG. 6 is a flowchart of a method for tracking location and resolving drift in Augmented Reality Head Mounted Displays with downward projection, according to an embodiment.

FIG. 6 is a flowchart of a method 600 for tracking location and resolving drift in AR HMDs with downward projection, according to an embodiment. Method 600 begins with block 610, where an AR device maps the environment in which the AR experience is to be provided. In various embodiments, an AR device in an HMD uses exposed cameras or range finders to identify various real objects within a defined space, such as a room, based on the visual appearance of those real objects and the distances from the user to those objects. For example, a back camera 430 that is exposed upward (relative to the visual plane of a user of the AR device) may identify a ceiling, windows, walls, wall decorations (e.g., posters, paintings, curtains), and the like. In another example, a front camera that is exposed downward (relative to the visual plane of a user of the AR device) may identify a floor, carpeting, walls, furniture and the like. In a further example, a camera exposed upward/downward but redirected (via a mirror or lens) to include the visual field of the user may identify objects visible to the viewer including furniture, walls, persons, pets, and the like. The AR application 120 may map the environment as part of an initial setup period for an AR experience or may periodically re-map the environment every m milliseconds to account for the user or real objects moving in the environment.

The AR application 120 uses the distances between real objects and each other and the AR device to determine where the objects are located in the environment relative to one another. The AR application 120 further uses the sensor suite 160 to determine the field of view for the viewer based on a reference to magnetic north (e.g., via magnetometer 161) or changes in position from a starting position (e.g., via accelerometers 162 and gyroscopes 163).

At block 620, the AR application 120 anchors virtual objects into the environment based on the AR experience chosen by the user, the confines of the environment, and any real objects present in the environment detected and positioned per block 610. The various virtual objects may be anchored at a predefined distance from the initial position of the user or based on the locations of real objects, and may be updated as the AR experience progresses. For example, a virtual object of a character may be anchored in a position corresponding to a real object of a chair to a first time in the AR experience to appear to be sitting in the chair. At a second time in the AR experience, the character may be re-anchored at a position within a predefined distance of the user so that the character is animated as walking up to the wearer from the chair.

At block 630 the AR application 120 determines the Field of View in the environment for the wearer to determine whether to display the virtual objects anchored in the environment. The AR application 120 uses positional data from the sensor suite 160 and an image of the environment from the upward facing camera to determine the direction that the wearer is facing, what objects (real and virtual) are within the field of view of the viewer, and where/when any virtual objects are to be output for display to the viewer. For example, with a user in an environment in which virtual objects are anchored, the AR application 120 determines whether to display one or more virtual objects based on whether the user has a line of sight to the location at which a particular virtual object is anchored. As the viewer of the AR experience may move about the environment or change the field of view without moving in the environment (e.g., rotating or tilting via the neck) and the real objects may move within the environment, the AR application may periodically re-determine the Field of View in the environment.

At block 640, the AR application 120 supplements the sensor suite 160 with a station keeping image captured by an upward facing camera. Because the sensor suite 160 may be confused by rapid movements and imprecision in the individual sensors, including saturation of one or more sensors in during large or rapid series of movements by the wearer, the AR application 120 use an image of the environment (and real objects therein) to determine how the HMD is oriented in the environment. In some embodiments, the AR application 120 compares the locations and positions of various objects above the typical plane of view for the wearer to determine the location and orientation of the AR device in the environment and the associated FOV for the wearer relative to an initial (or later) mapping of the environment. In some embodiments, an auxiliary device projects an orientation image (such as a crosshair image) onto the ceiling of the environment for the upward facing camera to capture.

The AR application 120 uses the station keeping images to collect data on the environment that are outside of the field of view of the wearer of the AR device, and thus are more likely to remain in static positions than objects within the field of view of the wearer (e.g., furniture, persons). The AR application 120 tracks the position of the objects in station keeping image relative to known positions from an initial (or later) reference frames with known positional information from prior-collected reference images to determine how the AR devices has moved within the environment relative to the static positions of objects located above the typical field of view of the wearer. For example, as the AR application 120 notes in an image from an upward mounted camera that the HMD is closer to a given wall, based on an apparent size of wall or ceiling feature being larger than from the mapping, the AR application 120 may update the location of the viewer in the environment. In another example, as the AR application 120 notes in an image from an upward mounted camera that more or less of the environment is visible in a particular direction, the AR application 120 determines a level or rotation of the AR device (e.g., when a wearer is looking up, down, to the left, to the right, or tilted/askew).

The AR application 120 may use the positional information instead of (or in the absence of) the data from the sensor suite 160 in response to a user command, a reliability threshold occurring, the data from the sensor suite 160 not being available, or the imaging positional data may be collected and averaged with the positional data collected by the sensor suite 160. In some embodiments, the AR application 120 supplements the sensor suite 160 by adjusting the data received from the sensor suite 160 with the positional information determined from the image (averaging the camera data with the sensor suite data), while in other embodiments the AR application 120 supplements the sensor suite 160 by replacing the data received from the sensor suite 160 with the positional information determined from the image. Method 600 may then conclude.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. An Augmented Reality (AR) device, comprising:
a viewport;
a mount assembly configured to capture a mobile computing device, the mount assembly including:
a lower surface that is transmissive to light;
an upper surface, located above the lower surface and configured to capture the mobile computing device between the upper surface and the lower surface, the upper surface including a region transmissive to light;

an optical arrangement configured to receive light transmitted through the lower surface and reflect light onto the viewport for reflection to a wearer of the AR device; and an additional optic, arranged above the region of the upper surface and configured to direct light from the environment outside of a field of view of the wearer.

2. The AR device of claim 1, wherein the additional optic is selectively positionable relative to the region of the upper surface via a slide-mount, comprising:

a first carrier captured via primary grooves defined in the mount assembly to travel in a first direction relative to the region; and a second carrier captured via second grooved defined in the first carrier to travel in a second direction orthogonal to the first direction and onto which the additional optic is mounted.

3. The AR device of claim 1, wherein the additional optic is selectively positionable relative to the region of the upper surface via an arm-mount, comprising:

a pivot mounted to the mount assembly selectively that is rotatable in a first plane; and an arm, including a telescopic segment to selectively adjust a length of the arm, connected to the pivot at a first end and to which the additional optic is mounted on a second end.

4. The AR device of claim 1, wherein the additional optic is selectively positionable relative to the region of the upper surface via an arm-mount, comprising:

a carrier beam, captured by the mount assembly in a slot defined in the mount assembly, to which the additional optic is mounted; and wherein the slot is defined with a size relative to the carrier beam to allow the carrier beam to selectively rotate and translate relative to the region in a plane parallel to the upper surface.

5. The AR device of claim 1, additional optic is one of:
a wide angle lens;
a filter; and
a mirror configured to direct light transmitted in a plane parallel to the upper surface to a plane orthogonal to the upper surface.

6. The AR device of claim 1, further comprising one of:
a smart phone captured in the mount assembly as the mobile computing device; and
a tablet captured in the mount assembly as the mobile computing device with a screen oriented to output light toward the optical arrangement and a back camera oriented to capture light through the region of the upper surface.

7. The AR device of claim 1, wherein the optical assembly is located below the lower surface and below eyes of the wearer such that the optical assembly is outside of a field of view for the wearer.

8. An Augmented Reality (AR) system, comprising:
a viewport;
a computing device, including a screen on a first face and a camera on a second face opposite to the first face;
an optical arrangement configured to receive light generated by the screen and reflect the light onto the viewport for reflection to a wearer of the AR system; and
an additional optic, arranged above the camera to direct light from the environment outside of a field of view of the wearer to the camera.

9. The AR system of claim 8, wherein the additional optic is selectively positionable relative to the second face via a slide-mount, comprising:

a first carrier captured via primary grooves defined in a mount assembly in which the mobile computing device is captured to travel in a first direction relative to the camera; and a second carrier captured via second grooved defined in the first carrier to travel in a second direction orthogonal to the first direction and onto which the additional optic is mounted.

10. The AR system of claim 8, wherein the additional optic is selectively positionable relative to the second face via an arm-mount, comprising:

a pivot mounted to a mount assembly in which the computing device is secured that is selectively rotatable in a first plane; and an arm, including a telescopic segment to selectively adjust a length of the arm, connected to the pivot at a first end and to which the additional optic is mounted on a second end.

11. The AR system of claim 8, wherein the additional optic is selectively positionable relative to the second face via an arm-mount, comprising:

a carrier beam, captured by a mount assembly in which the computing device is secured in a slot defined in the mount assembly, to which the additional optic is mounted; and wherein the slot is defined with a size relative to the carrier beam to allow the carrier beam to selectively rotate and translate relative to the camera in a parallel plane to the second face.

12. The AR system of claim 8, wherein the additional optic is one of:
a wide angle lens;
a filter; and
a mirror configured to direct light transmitted in a plane parallel to the second face surface to a plane orthogonal to the second face.

13. The AR system of claim 8, wherein the optical assembly is located below the lower surface and below eyes of the wearer such that the optical assembly is outside of a field of view for the wearer.

14. The AR system of claim 8, wherein the camera captures station keeping images of an upper portion of an environment in which the computing device provides an AR experience to the wearer that is outside of a field of view of the wearer to enable the computing device to determine an orientation of the system.

15. A method for tracking location and resolving drift in an Augmented Reality (AR) device, the AR device including a computing device having a screen on a first face and a camera on a second face opposite to the first face mounted in a mounting assembly to project an image from the screen onto an optical arrangement for viewing by a wearer of the AR device, the method comprising:

mapping locations for real objects in a physical environment in which the AR device resides to a virtual environment;

anchoring a virtual object at an anchor location within the virtual environment, based on the mapped locations of the real objects;

capturing a station keeping image of the environment from a first Field of View via the camera;

determining a second Field of View in the environment for the wearer of the AR device that is different from the first Field of View based on the relative locations of real objects present in the station keeping image; and in response to determining that the second Field of View includes an area of the physical environment corresponding to the anchor location in the virtual environment, outputting an image depicting the virtual object at a position on the screen to display the image depicting the virtual object in the physical environment at the anchor location.

16. The method of claim 15, wherein determining the second Field of View further comprises:
   determining a first orientation in the physical environment from the station keeping image;
   determining a second orientation in the physical environment from a magnetometer included in the AR device; and
   reconciling the first orientation and the second orientation to determine the second Field of View.

17. The method of claim 15, wherein determining the second Field of View further comprises:
   determining a first orientation in the physical environment from the station keeping image;
   determining a change in orientation from an initial orientation based on data from an accelerometer and a gyroscope included in the AR device; and
   reconciling the first orientation and the change in orientation from the initial orientation to determine the second Field of View.

18. The method of claim 15, wherein the station keeping image is captured in response to one of a drift threshold and a saturation threshold being satisfied for one of a magnetometer, an accelerometer, and a gyroscope included in the AR device.

19. The method of claim 15, wherein the station keeping image is captured through a wide angle lens in a light path of the camera.

20. The method of claim 15, wherein the station keeping image tracks a position of an orientation image projected onto a ceiling of the physical environment.

* * * * *